United States Patent [19]

Valdsaar

[11] 4,132,534
[45] Jan. 2, 1979

[54] ABRASIVE PARTICLES CONSISTING OF CRYSTALLINE TITANIUM DIBORIDE IN A METAL CARBIDE MATRIX

[75] Inventor: Herbert Valdsaar, Wilmington, Del.

[73] Assignee: E. I. Du Pont de Nemours and Company, Wilmington, Del.

[21] Appl. No.: 837,276

[22] Filed: Sep. 27, 1977

[51] Int. Cl.$^2$ .................. C04B 35/56; C04B 35/58
[52] U.S. Cl. .................. 51/307; 51/298 R; 51/308; 51/309 R; 106/43
[58] Field of Search ................ 51/307, 308, 309, 298; 106/43

[56] References Cited

U.S. PATENT DOCUMENTS

| | | | |
|---|---|---|---|
| 2,806,800 | 9/1957 | Glaser | 106/43 |
| 2,814,566 | 11/1957 | Glaser | 106/43 |
| 3,497,368 | 2/1970 | Williams | 106/43 |
| 3,808,012 | 4/1974 | Bailey et al. | 106/43 |
| 3,852,078 | 12/1974 | Wakatsuki et al. | 51/307 |
| 4,029,000 | 6/1977 | Nakamura et al. | 106/43 |

Primary Examiner—Donald J. Arnold

[57] ABSTRACT

This invention relates to abrasive particles and process for their preparation. The particles consist essentially of a matrix of titanium carbide, zirconium carbide and tantalum carbide, at least partially in solid solution form and grains of crystalline titanium diboride dispersed throughout the carbide matrix. These abrasive particles are particularly useful as components of grinding wheels for abrading steel.

18 Claims, No Drawings

ABRASIVE PARTICLES CONSISTING OF CRYSTALLINE TITANIUM DIBORIDE IN A METAL CARBIDE MATRIX

BACKGROUND OF THE INVENTION

This invention relates to abrasive particles consisting essentially of titanium carbide, zirconium carbide, tantalum carbide, and titanium diboride and a process for producing these particles.

Abrasive particles are incorporated into grinding wheels, cutting wheels and abrasive belts to grind or cut metals and other hard materials. Such wheels, belts and the like are judged by their ability to grind or cut rapidly with a minimum of applied force, with long service life and with the ability to produce a smooth, uniform surface with a minimum of structural damage. Desirable performance of these wheels, belts and the like are attributed to the abrasive particle which must possess great hardness and chemical inertness toward the material being ground, but other factors are also important as will be discussed below. The conventional abrasive particles of the trade are aluminum oxide and silicon carbide. These materials are inexpensive, but in the case of aluminum oxide, wear out rapidly or, in the case of silicon carbide, react when used on most steels. For certain applications expensive high performance abrasive particles such as diamond and cubic boron nitride are used. These materials have a very long service life, i.e., wear out very slowly, but cost approximately ten thousand times as much as conventional abrasives.

It is an object of this invention to provide abrasive particles which give performance approaching that of diamond and cubic boron nitride at a lesser cost.

Transition metal carbides, well-known for their great hardness and high melting points, are widely used in commercial applications such as cutting tools and dies, usually with a ductile metal binder. Although these carbides have great hardness and high melting points, repeated attempts to use them as abrasive have shown that they do not compete successfully with conventional abrasives such as aluminum oxide, particularly in the grinding of ferrous metals (L. Coes, Jr., *Abrasives*, Springer-Verlag, New York — Wien, 1971, pp. 114–116 and NSF Hard Materials Research, Volume 1, page 92, Carnegie-Mellon University Section, Pennsylvania State University 1972).

Some improvements in the physical properties, particularly heat conductivity and toughness of transition metal carbide composites used for cutting tools and wear resistant surfaces, have been achieved by combining one or more transition metal carbides with boron or transition metal borides as described in Glaser U.S. Pat. Nos. 2,806,800 and 2,814,566, Williams U.S. Pat. No. 3,497,368 and Schedler Austrian Pat. No. 199,886. These improvements are generally directed to cutting tool applications where hardness to resist abrasive wear and very high toughness to resist shock loading are required. Cutting tool art has shown that these properties are optimized by fine microstructural grain size (less than 1.0$\mu$m). On the other hand, an abrasive particle having the grinding characteristics of a high performance abrasive, specifically sharpness and long life, requires a combination of hardness with moderate toughness. The abrasive particle will have long-lived sharp cutting edges that predictably break down by fracture to give fresh cutting edges rather than rounded ones. If the toughness is too low, the particle is brittle and breaks down too quickly in abrasive use. Examples of this are pure titanium carbide and zirconium carbide which are hard but wear too fast. Essentially an abrasive particle must be friable to a certain controlled degree, a property of a very limited range of hard chemical compositions and apparently also promoted by a relatively coarse grain structure. The major chemical constituents of the abrasive particles should be nonreactive at the grinding temperature with the metals being ground. Thus while the above patents describe composites of a very wide range of transition metal carbides and borides including those of titanium, molybdenum, tungsten, iron, manganese, chromium and silicon, they in no way teach the limited range of compositions or the process techniques required to produce the high performance abrasive of this invention.

The objective of this invention is met by abrasive particles which consist essentially of a mixed carbide matrix of titanium carbide, zirconium carbide, and tantalum carbide, at least partially in solid solution form and having a crystallite or grain size of up to 30$\mu$m, and crystals of titanium diboride, 0.5$\mu$m to 30$\mu$m in size, dispersed throughout the carbide matrix.

It will be understood that percentages as used in this specification are by mole unless otherwise specified. In addition, in describing the abrasive particles the ranges discussed for the carbide and boride components are based on the total moles of the titanium, zirconium, and tantalum carbides and borides, or titanium, zirconium and tantalum carbides, as specified. However, all analytical results presented are based on analysis of the total weight of the abrasive particles.

It will further be understood that the presence or absence of solid phases is as determined by X-ray diffraction.

SUMMARY OF THE INVENTION

This invention is directed to abrasive particles comprising a composite system wherein one component is a matrix of one or more carbide phases composed of titanium carbide (TiC), zirconium carbide (ZrC) and tantalum carbide (TaC) and the other component is crystalline titanium diboride (TiB$_2$). The titanium diboride component ranges from 2 to 35 mole percent of the carbide-boride system. The carbide component ranges from 98 to 65 mole percent of the carbide-boride system and itself contains from 1 to 36 mole percent of tantalum carbide and from 18 to 54 moles percent of zirconium carbide, both based on total moles of carbide, the remainder being titanium carbide.

The abrasive particles of this invention are prepared by thoroughly mixing tantalum diboride (TaB$_2$), titanium carbide (TiC), and zirconium carbide (ZrC) said TiC being present in an amount in excess of the stoichiometric amount required to react with the total amount of TaB$_2$ according to the equation TiC + TaB$_2$ → TiB$_2$ + TaC; hot-pressing the mixture from 1 to 60 minutes at a temperature from 1900° C. to 2200° C. at a pressure of at least 2000 psi to form a hot-pressed compact having a room temperature density of 5.1 to 8.3 g./cc.; preferably the components will be hot-pressed for from 5 to 15 minutes at a temperature of from 1900° C. to 2050° C. and at a pressure of at least 4,000 psi; and then crushing the resulting hot-pressed compact to form abrasive particles.

Alternatively, the abrasive particles of this invention can be prepared as described above except that a mixture of TiC, ZrB$_2$ and TaC or a mixture of TiC, ZrC, TaC and TiB$_2$ in the appropriate amounts to give the desired product is heated under pressure where the ingredients combine to form a hot-pressed compact.

The abrasive particles of this invention have a particle size of from −20 to +400 mesh (Standard U.S. Sieve) or 841μm to 37μm. When the abrasive particles are used in abrasive tools, such as grinding wheels, sizes from −40 to +200 mesh (420μm to 74μm) are preferred. For applications where the abrasive particles are used in a lapping composition, finer particles are used, for example, sizes from −325 (44μm) to +400 (37μm) are preferred. The Knoop$_{1000}$ hardness of these abrasive particles, as measured on the cold compact prior to crushing, ranges upward from 1,600 kg./mm$^2$ to 2,000 kg./mm$^2$.

DETAILED DESCRIPTION OF THE INVENTION

The abrasive particles of this invention contain a matrix of titanium carbide (TiC), zirconium carbide (ZrC) and tantalum carbide (TaC) with grains of crystalline titanium diboride (TiB$_2$) dispersed therethrough. The carbide matrix contains one or more solid solutions of TiC, ZrC and possibly TaC and also some TiC, ZrC or TaC which may not have entered into solid solution. Formation of solid solutions in the matrix depends on processing conditions, such as particle size of the starting materials and pressing temperatures. In the matrix the carbides have a crystallite size of up to 30μm. The boride component of the abrasive particles is present as grains of crystalline TiB$_2$ having a length in the range from about 0.5μm to about 30μm. These carbide and TiB$_2$ grains are readily observable on polished and etched surfaces of the abrasive particles of this invention by optical microscopy.

Transition metal carbides and borides tend to be deficient in carbon and boron in terms of their stoichiometric formulas. For example, in general practice titanium carbide actually occurs as TiC$_{1-x}$, where x = 0 to 0.5. The same applies to other transition metal carbides and borides used in this invention. Therefore, although the carbon or boron content of the particles of this invention is normally close to, but not necessarily equal to, stoichiometric, i.e., about TiC$_{0.9}$, it is conventional to describe these compositions by their stoichiometric formulas. It will be understood that such formulas are meant to include some lack of carbon and boron and do not cover only exact stoichiometric compositions.

The abrasive particles of this invention comprise a composite system wherein one component is a matrix of one or more carbide phases composed of titanium carbide (TiC), zirconium carbide (ZrC) and tantalum carbide (TaC) and the other component is crystalline titanium diboride (TiB$_2$). The titanium diboride component ranges from 2 to 35 mole percent of the carbide-boride system. The carbide component ranges from 98 to 65 mole percent of the carbide-boride system and itself contains from 1 to 36 mole percent of tantalum carbide, preferably 5 to 25 mole percent tantalum carbide, and from 18 to 54 mole percent of zirconium carbide, preferably 20 to 35 mole percent zirconium carbide, both based on total moles of carbide, the remainder being titanium carbide.

In addition to the primary components of the abrasive particles, other materials can be present in amounts up to about 20%, based on the weight of the abrasive particles, so long as the structure of the abrasive particles, i.e., TiC/ZrC/TaC mixed carbide matrix with grains of crystalline TiB$_2$ having a length mostly in the range from about 0.5μm to about 30μm dispersed therethrough, is maintained. Such materials, e.g., boron, Al$_2$O$_3$, TiN, ZrN, silicon, carbon, silicon carbide (SiC), boron carbide (B$_4$C), titanium dioxide (TiO$_2$), zirconium dioxide (ZrO$_2$), titanium and zirconium may be present in an amount which will not detract from the abrasive properties of the particles of this invention and may, in some instances, be added to modify the properties of the abrasive particles or to render the abrasive particles more suitable for wheel fabrication. These additives are most suitably added to the mixture of starting materials prior to milling in the form of powders having similar size characteristics to the transition metal carbide and boride powders.

The abrasive particles of this invention are prepared from tantalum diboride (TaB$_2$), titanium carbide (TiC), and zirconium carbide (ZrC) said TiC being present in an amount in excess of the stoichiometric amount required to react with the total amount of TaB$_2$ according to the equation TiC + TaB$_2$ → TiB$_2$ + TaC. Alternatively, the abrasive particles of this invention can be prepared from mixtures of TiC, ZrB$_2$ and TaC or mixtures of TiC, ZrC, TaC and TiB$_2$ in the appropriate amounts to give the desired product.

The transition metal borides and carbides useful as starting compounds in the preparation of the abrasive particles of the invention are commercially available in the form of powders containing particles of up to 100μm in diameter. After mixing the starting compounds, milling of the mixture, and particularly extended milling on the order of days, is not necessary as the desired composite will form using particles as large as about 100μm, though a maximum diameter of 30μm is preferred. If some milling is performed a conventional alumina ball mill can be used and no liquid or inert gas cover is necessary.

Although this invention is not bound by any particular theory or explanation, it is believed that the grain size of the mixed carbide matrix and the grain size and distribution of TiB$_2$ throughout the mixed carbide matrix is primarily responsible for the superior performance of the abrasive particles of the invention. The grain size of the mixed carbide matrix and the grain size and distribution of TiB$_2$ in the mixed carbide matrix can be influenced at least to some extent by the particular process conditions, e.g., milling time, temperature, and duration of reaction.

Although extended milling is not essential to the production of good abrasive particles, sufficient milling, i.e., from one to twelve hours, to insure starting compound particles having a maximum diameter of about 30μm is preferred. To produce especially sharp abrasive particles, it is recommended that the starting compounds be milled from one to six hours as it is believed that extended milling tends to give a final product with poorer fracture characteristics that do not regenerate sharp cutting edges.

When the starting compounds are heated under pressure, the mixture of starting compounds can be pressed in a conventional molding assembly consisting of a graphite sleeve in a graphite die surrounded by loose graphite powder and encased in a silica sleeve. The molding assembly is blanketed with nitrogen or inert gas such as helium or argon. Alternately the starting compounds can be heated under pressure in a vacuum. In practice the mixture of starting compounds is placed in the graphite sleeve between two graphite discs and subjected to high pressure, e.g., 4,000 p.s.i., at elevated temperatures, e.g., 2000° C. The duration of the compaction at top temperature, herein referred to as hold time, is from about 1 to 60 minutes, and preferably from about 5 to 15 minutes. The compact resulting from this hot-pressing operation has a room temperature density of 5.1 to 8.3 g./cc.

The temperature during pressing of the three-component starting mixtures ($TaB_2$ and excess TiC + ZrC or $ZrB_2$ and excess TiC + TaC) or four-component starting mixture (TiC, ZrC, TaC and $TiB_2$) can be from 1900° C. to 2200° C. and preferably from 1900° C. to 2050° C.

To achieve the best combination of performance properties, such as sharpness, fracture characteristics and grinding ratio, it is recommended that the three- or four-component starting mixture be milled from 1 to 6 hours and hot-pressed for 15 minutes at 2000° C. and 4,000 p.s.i.

The compact which results from subjecting the starting mixture to high temperature and pressure can be crushed to the desired particle size by any of a variety of conventional methods, e.g., jaw crushing, ball milling, rod milling and impact milling. Fines generated by the crushing operation, i.e., particles of smaller than desired size, can be recycled by substitution for all or part of the raw materials used to make the hot-pressed compacts.

The abrasive particles of the invention are particularly useful as components of abrasive wheels and other abrasive devices such as abrasive belts, papers (e.g., sandpaper), and honing sticks. The general procedures for fabricating abrasive wheels are well known in the art.

Abrasive wheels comprising abrasive particles, bonding agents, and optionally fillers and/or grinding aides, can be prepared by conventional methods in form suitable for a variety of applications. It will be understood that the abrasive particles of this invention can be included in wheels which employ inorganic bonding agents such as vitreous and ceramic materials, cements such as magnesium oxychloride, metals such as copper and various alloys or which employ organic bonding agents such as phenolic resins, polyimide resins, etc. It will also be understood that fillers and grinding aids such as calcium carbonate, cryolite, talcum, sulfur, dolomite and silicon carbide may be included in the grinding wheel composition if desired. The choice of bonding agent and other components depends to a large extent on the use to which the abrasive wheel is to be put and can be determined by one skilled in the art. The mix is molded to the desired shape, such as an abrasive wheel, and is cured, usually by heating during or after molding.

Specifically, it has been found that the abrasive particles of this invention can be formed into vitreous bonded wheels by using any one of several commercially available glass frits. Frits which work particularly well have been found to have compositions in the vicinity of 55% $SiO_2$, 20% $B_2O_3$, 10% ZnO, 8% $Na_2O$ and 4% CaO. A secondary binder, such as paraffin or sodium silicate solution, can be used to give green strength between molding and firing. The firing cycle includes a low temperature heating in air or inert gas to remove any organic binder followed by high temperature heating at 850° to 1000° C. in dry nitrogen. Contact with an oxidizing or wet atmosphere should be restricted to temperatures under 450° C.

There are three general areas of use in industry for abrasive wheels: (1) cutting hard materials, wherein wheels are usually resin bonded, (2) internal grinding, e.g., finishing the inside of a bearing race or a tube section, wherein wheels are usually vitreous bonded, and (3) surface grinding. e.g., machining a flat surface, wherein wheels are either vitreous, metal or resin bonded.

Wheels containing the abrasive particles of this invention are useful for abrading variety of materials such as metals, metal alloys, glass and quartz and are especially useful for grinding ferrous metal materials such as hard steels, e.g., AISI E52100.

It is well-known in the art that in commercial practice the performance of an abrasive wheel depends not only on the characteristics of the abrasive particles, but also on the strength of the bond between the particles and on the wheel structure, i.e., porosity, particle/bond-material weight ratio, etc. However, for a given bond type and wheel structure, the characteristics of the abrasive particles are primarily responsible for the performance of the abrasive wheel.

The performance of grinding wheels containing the abrasive particles of this invention might be improved by cladding the abrasive particles prior to wheel fabrication with metals or metal alloys. Such metals include nickel, copper and various alloys. The metal coatings can make up to 60% by weight of the weight of the coated abrasive particle.

The major criteria for evaluating the performance of an abrasive particle in an abrasive wheel are (1) grinding ratio, i.e., the ratio of the volume of metal removed to the volume of the wheel consumed, (2) workpiece profile retention, i.e., ability of the wheel to maintain an even wear surface as measured by the maximum variation of a peak-to-valley axial trace of the workpiece surface during the grinding operation, (3) surface finishing, i.e., ability of the wheel to produce a smooth surface on the workpiece as determined from the microscopic peak-to-valley variations on the surface of the workpiece, and (4) sharpness of the abrasive particles in the abrasive wheel, designated as lambda ($\Lambda$), i.e., the metal removal parameter, and measured as the volume of metal removed per minute and inch of wheel width divided by the force required on the wheel.

Procedures which can be employed to determine these properties are discussed in detail in "Principles of Grinding" by R. S. Hahn and R. P. Lindsay, a five-part series which appeared in Machinery Magazine, July to November 1971. A brief description of the tests employed to develop data reported herein is presented in the following paragraphs.

Grinding ratio is the ratio of the volume of metal removed to the volume of wheel consumed. Before and after each test the dimensions of the wheel and the workpiece are measured with a micrometer to about 0.0001 inch. The volume of material lost by the workpiece and the wheel is then calculated and the former divided by the latter. For cutting wheels it is practical to calculate the groove volume in the workpiece by weighing the workpiece before and after the test.

Workpiece profile retention is the ability of the wheel to hold an even wear surface and produce the same workpiece profile after many runs without truing. With usage the center of a wheel may wear differently from the sides, or one side may be different from the other. This would produce nonuniform workpieces. The workpiece surface is measured with a Bendix Proficorder. The maximum peak-to-valley distance of such a trace is called the "profile".

Surface finish is the quality of the workpiece surface after grinding. The microscopic peak-to-valley variations of a Bendix Proficorder trace are called "surface finish".

Sharpness of the abrasive particles is related to the metal removal parameter, lambda ($\Lambda$), the metal removed per unit of time, wheel width and force applied on the wheel, expressed as in.$^3$/min.-lb.-in. $\Lambda$ is calculated by measuring the cubic inches of metal removed per minute per inch of wheel width as a function of force applied on the wheel per inch of width. The slope of a plot of the metal removal rate versus applied force is $\Lambda$.

Typical resin bonded abrasive wheels containing from 25% to 50% by volume of the abrasive particles of the invention generally exhibit the following performance properties when grinding A.I.S.I. E52100 steel at 0.1 m.$^3$/min.: grinding ratio from 400 to 8,000, preferably over 1,000, workpiece profile retention from 40 to 160 microinches (1.02 to 4.06$\mu$m), and preferably less than 70 microinches (1.79$\mu$m); surface finish from 3 to 10 microinches (0.08 to 0.26$\mu$m); and $\Lambda$ from 0.0008 to 0.0030 in.$^3$/min.-lb.-in. (0.0114 to 0.0428 cm.$^3$/min.-kg.-cm.).

High performance abrasive wheels exhibit an optimum balance of the above-described properties. Generally, the higher the grinding ratio the better so long as other properties such as workpiece profile retention, surface finish, and $\Lambda$ are not sacrificed. A workpiece profile retention of less than about 70 microinches (1.79$\mu$m), a surface finish of less than 20 microinches (0.51$\mu$m), and sharpness, i.e., $\Lambda$, of at least 0.0010 in.$^3$/min.-lb.-in. (0.0142 cm.$^3$/min.-kg.-cm.) are generally characteristic of a high performance abrasive wheel.

DESCRIPTION OF THE ANALYSES

Titanium, zirconium and tantalum are determined by X-ray fluorescence. About 0.154 gram of sample is oxidized in air at 1000° C. overnight and then fused in borax in a platinum crucible until the sample dissolves. The melt is then poured onto a preheated aluminum plate at 350° C. to form a pellet, which is ground to an optically flat surface on one side using a 45-micron diamond polishing disc. The pellet is analyzed in a G.E. XRD-6 Spectrograph. The platinum target X-ray tube is operated at 50 kV/50mA for Ti, at 35 kV5mA for Zr and at 50 kV/50mA for Ta using first order Ti$_{k\alpha}$, Zr$_{k\alpha}$ and Ta$_{l\alpha}$ spectral lines. The radiation is dispersed by a LiF analyzing crystal and is detected with a scintillation counter. Pulse height analysis is applied and data collected for a 100-second period. The X-ray intensities are compared to calibration curves prepared from pure TiO$_2$, ZrO$_2$ and Ta$_2$O$_5$ standards fused in borax under identical conditions.

Carbon is determined by "Leco" carbon analyzer, where the samples are burned in oxygen and CO$_2$ is determined in an absorption train. Boron is determined by fusion of the sample with carbonate, dissolution in HCl and titration with NaOH in the presence of mannitol.

Minor impurities are determined by spectrographic analysis in a D.C. arc using a Jarrell-Ash, Model 7a-7100 3.4 meter, plane grating spectrograph.

Density of the abrasive particles is determined by liquid displacement. About 5 to 10 grams of the abrasive particles ($-60/+170$ mesh or $-250/+88\mu$m) are placed in a 25-ml. specific gravity bottle and the volume of the sample is calculated from alcohol displacement.

The density is expressed as "apparent density" and differs from the true density of the phases present by the porosity of the compact. The abrasive particles of this invention have a porosity of less than about 5%.

Microhardness on the Knoop scale is determined with a Tukon Tester, Model MO, made by the Wilson Mechanical Instrument Division, American Chain and Cable Co., Inc. Coarse fragments of the compacts are embedded in Bakelite and polished with consecutively finer diamond abrasive, finishing with 1 $\mu$m size. For each determination, ten measurements are made on the polished surface with an applied load of 1000 grams held for 15 seconds.

Phase analysis is done by X-ray diffraction using a Debye-Scherrer powder camera with Cu$_{k\alpha}$ radiation from a Norelco type 12045B unit at 40kV/20mA, and 5 to 10 hour exposure.

Titanium diboride crystal size is determined by optical microscopy. Polished surfaces are produced by the same method used for microhardness determination. Good contrast between the TiB$_2$ phase and the mixed carbide matrix is obtained by electrolytic etching for about one second at 2 volts in an acid solution of 30%HF, 5%HNO$_3$, 1%H$_2$O$_2$ at room temperature. Several dark field photomicrographs are taken with a Leitz Panphot microscope at a magnification of 500x on Polaroid type 47 film. These photos are then enlarged to 8" × 10" and approximately 50 TiB$_2$ grains measured.

Carbide crystallite or grain size is determined by the same procedure used for titanium diboride crystal size except that after the HF etch the sample is washed with distilled water and then etched in a solution of 15 grams of K$_3$Fe(CN)$_6$ and 15 grams of KOH in 100 ml. of distilled water at 50° C. This etch reveals the carbide grain boundries.

EXAMPLES 1-16

Two hundred gram blends of commercial titanium carbide, zirconium carbide and tantalum diboride powders containing particles having diameters up to 100$\mu$m are thoroughly mixed in the proportions listed in Table 1. The powders are milled at 60 rpm for six hours in a porcelain ball mill having a 4.875 inch inside diameter (12.4 cm.) and 5.58 inch outside diameter (14.9 cm.) with $\frac{3}{8}$ inch diameter (0.95 cm.) alumina balls.

After milling, the maximum particle size in the powder is about 30$\mu$m. About 100 grams of the mixture is then placed in a cylindrical graphite mold having a diameter of two inches (5.1 cm.), and induction heated under nitrogen gas in the presence of loose graphite powder in the space around the mold. The heat-up period is two and one-half hours. The mixture is held at a temperature of from 2000° C. to 2200° C., as indicated in Table 1, for 15 minutes and is pressed at 4,000 p.s.i. (281.2 kg./cm.$^2$). A pressure of 2,000 p.s.i. (140.6 kg./cm.$^2$) is applied at the start of heating and increased to 4,000 p.s.i. (281.2 kg./cm.$^2$) when the mold reaches a temperature of about 1900° C. and is held at this pressure for the remaining heat-up period and through the temperature hold period. After the mold has cooled, the cold compact is removed from the mold. The compact is size-reduced in a conventional jaw-crusher and then by hand in a steel mortar. The crushed product is screened into size fractions having the following mesh sizes (U.S. Standard Sieve): $+60$, $-60/+80$, $-80/+100$, $-100/+140$, $-140/+170$, $-170$ ($+250\mu$,

−250/+177μ, −177/+149μ, −149/+105μ, −105/+88μ, −88μ).

Microhardness on the Knoop scale is determined on a piece of the compact. Compositions within the preferred range specified above were observed to have microhardness in the range of from 1,600 to 2,000 kg./mm.$^2$ under 1,000 gm. load.

The apparent density and product composition are listed in Table 1.

The elemental analysis of the abrasive particles is listed in Table 2.

Electron probe microanalysis of several samples with an Applied Research Laboratories type EMX model 21000-11 microprobe shows high concentration areas for Ti and C, Zr and C, Ta and C, Ti and B, but not for Ta and B. This indicates that TaB$_2$ is absent in the product, at least to the degree of the resolution of the method. The conclusion is also supported by X-ray powder diffraction patterns, where TaB$_2$ lines are absent.

Polished and etched coarse fragments of the compacts are checked for TiB$_2$ grain size and carbide grain size. The TiB$_2$ is found to be present as grains 0.5 to 30μm long while the carbide grains are up to 30μm in size.

CONTROLS

The samples identified as Control A, B and D-M are prepared and tested by the procedure of Examples 1-16.

The sample identified as Control C is prepared as follows:

Two hundred gram blends of commercial titanium carbide, zirconium carbide and tantalum diboride containing particles having diameters up to 100μm are mixed in the same proportions used in Examples 5-9 by wet milling in a steel ball mill for 48 hours. Two sizes of steel balls are used simultaneously: (a) large size, 1" (2.54 cm.) diameter, 1870 grams total weight, (b) small size, ¼" (0.64 cm.) diameter, 1486 grams total weight. Two hundred grams of heavy mineral oil ("Nujol") are added to the ball mill. After continuous milling for 48 hours, the oil is rinsed off with tetrachloroethylene ("Perclene") and the filtered material dried in the oven at 110° C. The material is then treated with dilute sulfuric acid (1:30) overnight at room temperature to remove steel abraded from the mill, filtered, washed with ethanol and dried. Two 90-gram discs are then pressed under the same conditions used in Examples 1-16. Further processing and testing of the abrasive particles is performed by the procedure of Examples 1-16.

Preparation conditions, analyses and grinding results for Controls A–M are given in Tables 1, 2 and 3.

TABLE 1

| | | Starting Components (wt. percent) | | | | | Hot Pressing Temp. °C | Apparent Density g/cc | Product Composition Mole % on Ti, Zr, Ta carbide/boride basis* | | | Carbide Matrix Composition Mole % on Ti, Zr, Ta carbide basis* | | |
|---|---|---|---|---|---|---|---|---|---|---|---|---|---|---|
| | No. | TiC | ZrC | TaC | TaB$_2$ | TiB$_2$ | | | TiB$_2$ | TiC + ZrC + TaC | | TiC | ZrC | TaC |
| | 1 | 65 | 30 | — | 5 | — | 2000 | 5.12 | 2.1 | 97.9 | | 74.8 | 23.4 | 1.8 |
| Control A | | 86 | 5 | — | 9 | — | " | 5.23 | 3.4 | 96.6 | | 91.7 | 4.9 | 3.4 |
| | 2 | 60 | 30 | — | 10 | — | " | 5.48 | 3.2 | 96.8 | | 72.6 | 23.8 | 3.6 |
| | 3 | 39 | 49 | — | 12 | — | " | 6.00 | 5.6 | 94.4 | | 51.6 | 43.0 | 5.4 |
| Control B | | 50 | 15 | 15 | — | 20 | " | 5.86 | 19.7 | 80.3 | | 77.5 | 14.0 | 8.5 |
| | 4 | 44 | 30 | 19 | — | 7 | " | 5.40 | 7.1 | 92.9 | | 62.1 | 29.3 | 8.6 |
| | 5 | 50 | 30 | — | 20 | — | " | 5.78 | 8.7 | 91.3 | | 64.5 | 26.9 | 8.6 |
| | 6 | " | " | — | " | — | " | 5.93 | 9.1 | 90.9 | | 60.8 | 30.5 | 8.7 |
| | 7 | " | " | — | " | — | " | 5.76 | 9.1 | 90.9 | | 61.5 | 29.7 | 8.8 |
| | 8 | " | " | — | " | — | " | 5.71 | 9.1 | 90.9 | | 61.2 | 30.0 | 8.8 |
| | 9 | " | " | — | " | — | " | 5.77 | 9.4 | 90.6 | | 61.1 | 30.0 | 8.9 |
| | 10 | " | " | — | " | — | 2100 | 5.82 | 7.2 | 92.8 | | 61.4 | 29.9 | 8.7 |
| | 11 | " | " | — | " | — | 2200 | 5.70 | 6.1 | 93.9 | | 61.8 | 29.2 | 9.0 |
| Control C | | " | " | — | " | — | 2000 | 5.54 | 9.2 | 90.8 | | 64.7 | 26.2 | 9.1 |
| Control D | | 56 | 15 | — | 29 | — | 2000 | 5.96 | 11.1 | 88.9 | | 71.4 | 15.5 | 13.1 |
| Control E | | " | " | — | " | — | 2100 | 6.04 | 10.7 | 89.3 | | 71.7 | 15.3 | 13.0 |
| Control F | | " | " | — | " | — | 2200 | 6.03 | 11.0 | 89.0 | | 70.9 | 16.0 | 13.1 |
| | 12 | 50 | 20 | — | 30 | — | 2000 | 6.12 | 10.2 | 89.8 | | 58.0 | 21.2 | 20.7 |
| | 13 | 23 | 39 | — | 38 | — | 2000 | 7.09 | 17.6 | 82.4 | | 26.9 | 49.2 | 23.9 |
| Control G | | 51 | 3 | — | 46 | — | 2000 | 6.56 | 18.1 | 81.9 | | 70.6 | 3.3 | 26.1 |
| | 14 | 28 | 24 | — | 48 | — | 2000 | 7.33 | 23.2 | 76.8 | | 33.5 | 33.3 | 33.2 |
| | 15 | 28 | 24 | — | 48 | — | 2100 | 7.32 | 22.2 | 77.8 | | 33.9 | 33.4 | 32.7 |
| | 16 | 28 | 24 | — | 48 | — | 2200 | 7.30 | 23.3 | 76.7 | | 33.4 | 33.6 | 33.0 |
| Control H | | 39 | 10 | — | 51 | — | 2000 | 7.27 | 22.4 | 77.6 | | 53.3 | 14.0 | 32.7 |
| Control I | | " | " | — | " | — | 2100 | 7.07 | 22.5 | 77.5 | | 53.7 | 14.2 | 32.1 |
| Control J | | " | " | — | " | — | 2200 | 7.21 | 25.6 | 74.4 | | 51.6 | 14.8 | 33.6 |
| Control K | | 13 | 29 | — | 58 | — | 2000 | 7.59 | 26.9 | 73.1 | | 19.0 | 42.2 | 38.8 |
| Control L | | 32 | 5 | — | 63 | — | 2000 | 7.15 | 27.4 | 72.6 | | 48.9 | 9.0 | 42.1 |
| Control M | | 22 | 13 | — | 65 | — | 2000 | 8.27 | 36.7 | 63.3 | | 13.6 | 23.7 | 62.6 |

*Calculated from the analysis

TABLE 2

| | | ELEMENTAL ANALYSIS (Weight percent) | | | | | | | | | | | | | | | |
|---|---|---|---|---|---|---|---|---|---|---|---|---|---|---|---|---|---|
| | No. | Ti | Zr | Ta | C | B | Al | Fe | Si | Cr | Mo | W | V | Co | Ni | Mg | Ba | Mn |
| | 1 | 51.2 | 29.7 | 4.4 | 15.22 | 0.64 | >1. | >1. | .5 | .03 | .01 | <.1 | .01 | .01 | .003 | .03 | .02 | .005 |
| Control A | | 65.1 | 6.4 | 8.7 | 16.26 | 1.09 | >1. | >1. | .5 | .03 | .01 | >1. | .02 | .001 | .01 | .005 | .01 | .02 |
| | 2 | 49.6 | 29.6 | 9.0 | 14.74 | 0.99 | >1. | >1. | .3 | .05 | .02 | .2 | .02 | .01 | .01 | .005 | .01 | .005 |
| | 3 | 30.4 | 48.6 | 11.5 | 13.10 | 1.41 | >1. | >1. | .2 | .05 | .1 | <.1 | .02 | .02 | .01 | .05 | .02 | .02 |
| Control B | | 52.5 | 13.7 | 16.4 | 12.44 | 5.68 | >1. | .5 | .08 | .02 | .02 | .1 | .05 | .01 | .05 | .005 | .01 | .05 |
| | 4 | 38.7 | 30.9 | 18.0 | 11.72 | 1.90 | >1. | >1. | .3 | .02 | .05 | <.1 | .02 | .01 | .01 | .05 | .02 | .05 |
| | 5 | 41.0 | 27.7 | 17.2 | 9.80 | 2.13 | .5 | .5 | .05 | .01 | <.01 | <.1 | .03 | .005 | .01 | .05 | .01 | .05 |
| | 6 | 37.3 | 30.6 | 17.4 | 12.97 | 2.38 | >1. | >1. | .05 | .02 | <.01 | <.1 | .05 | .02 | .01 | .05 | .01 | .05 |
| | 7 | 38.2 | 30.3 | 17.8 | 13.01 | 2.40 | >1. | .3 | .03 | .03 | <.01 | <.1 | .03 | .01 | .005 | .05 | .02 | .001 |
| | 8 | 37.5 | 30.1 | 17.6 | 13.06 | 2.39 | >1. | .5 | .03 | .05 | <.01 | <.1 | .03 | .005 | .01 | .05 | .02 | .02 |
| | 9 | 37.8 | 30.2 | 17.8 | 12.49 | 2.47 | >1 | .5 | .05 | .02 | <.01 | <.1 | .08 | .005 | .01 | .05 | .02 | .002 |
| | 10 | 36.7 | 30.2 | 17.4 | 12.59 | 1.86 | >1 | .03 | .3 | .03 | .02 | <.1 | .05 | .01 | .001 | .05 | .02 | .002 |
| | 11 | 36.9 | 30.1 | 18.2 | 13.19 | 1.59 | >1. | >1. | .03 | .01 | <.01 | <.1 | .05 | .005 | .02 | .05 | .01 | .001 |

TABLE 2-continued

| | No. | Ti | Zr | Ta | C | B | Al | Fe | Si | Cr | Mo | W | V | Co | Ni | Mg | Ba | Mn |
|---|---|---|---|---|---|---|---|---|---|---|---|---|---|---|---|---|---|---|
| Control | C | 39.8 | 26.3 | 17.7 | 9.70 | 2.42 | .5 | .2 | .03 | .20 | .02 | .1 | .03 | .001 | .01 | .03 | .01 | .03 |
| Control | D | 42.1 | 14.8 | 24.9 | 12.54 | 2.83 | >1. | >1. | .5 | .05 | .02 | .1 | .03 | .03 | .05 | .05 | .02 | .03 |
| Control | E | 42.4 | 14.8 | 25.0 | 12.27 | 2.74 | >1. | .7 | .05 | .05 | .03 | >1. | .03 | .005 | .01 | .05 | .01 | .001 |
| Control | F | 42.4 | 15.5 | 25.3 | 12.02 | 2.84 | >1. | >1. | .5 | .05 | .05 | .2 | .03 | .02 | .03 | .03 | .01 | .05 |
| | 12 | 37.3 | 19.8 | 26.5 | 11.63 | 2.75 | >1. | >1. | .3 | .05 | .2 | .1 | .02 | .02 | .03 | .05 | .02 | .003 |
| | 13 | 17.7 | 34.4 | 33.2 | 8.51 | 3.54 | >1. | .5 | .1 | .1 | >1. | .1 | .02 | .05 | .03 | .05 | .02 | .001 |
| Control | G | 38.7 | 4.0 | 37.6 | 9.54 | 4.17 | >1. | >1. | .5 | .1 | >1. | >.1 | .02 | .05 | .03 | .05 | .02 | .02 |
| | 14 | 21.6 | 21.5 | 42.5 | 7.93 | 4.63 | >1. | .5 | .1 | .05 | .5 | .1 | .02 | .02 | .02 | .03 | .02 | .001 |
| | 15 | 21.4 | 21.8 | 42.4 | 7.99 | 4.41 | >1. | .5 | .1 | .3 | .5 | .2 | .02 | .02 | .02 | .03 | .01 | .002 |
| | 16 | 21.6 | 21.7 | 42.3 | 8.19 | 4.64 | >1. | .2 | .05 | .3 | .2 | .2 | .1 | .01 | .003 | .05 | .02 | .001 |
| Control | E | 29.6 | 9.6 | 44.5 | 8.39 | 4.70 | >1. | >1. | .2 | .03 | .01 | .1 | .07 | .01 | .03 | .05 | .02 | .1 |
| Control | I | 29.4 | 9.6 | 43.0 | 8.41 | 4.66 | >1. | .2 | .5 | .3 | .01 | .2 | .05 | .03 | .07 | .02 | .01 | .001 |
| Control | J | 29.9 | 9.8 | 44.1 | 8.50 | 5.40 | .5 | >1. | .5 | .3 | .01 | .2 | .05 | .03 | .1 | .002 | .01 | .001 |
| Control | K | 17.2 | 24.8 | 45.2 | 7.24 | 5.12 | .5 | >1. | .2 | .5 | 1. | .1 | .01 | .05 | .03 | .01 | .01 | .01 |
| Control | L | 27.9 | 5.5 | 51.2 | 7.27 | 5.49 | >1. | .5 | .2 | .5 | .6 | 1. | .05 | .05 | .07 | .02 | .02 | .001 |
| Control | M | 16.8 | 10.6 | 55.5 | 5.21 | 6.14 | >1. | >1. | .1 | .5 | 1. | >1. | .02 | .05 | .03 | .05 | .02 | .005 |

Grinding Results

Rimmed test wheels are prepared using standard procedures known in the art. The abrasive particles are mixed with a phenolic resin containing inorganic fillers, such as dolomite, $CaCO_3$, and finely divided SiC, and are then hot-pressed around a cylindrical aluminum core. The abrasive grain comprises 25% of the wheel volume exclusive of the core while the remaining 75% is resin and filler. The rimmed wheels are ⅝ inch (1.59 cm.) wide with a rim thickness of 1/16 inch (0.16 cm.). The wheel diameter is 1½ inch (3.81 cm.). The abrasive particle sizes are given in Table 3.

The wheels are tested on AISI E52100 steel using a model ICF70 controlled force internal grinder manufactured by the Cincinnati-Milacron Corporation, Heald Division. The machine is operated at a wheel speed of 6400 ft./min. (1951 m/min.), workspeed of 200 ft./min. (61 m/min.), constant down feed of 0.1 in.$^3$/min. (0.016 cm.$^3$/min. per inch (2.54 cm.) of wheel width and axial reciprocation magnitude of 0.060 inch (0.152 cm.). Some tests are also run at higher downfeed rates as shown in Table 3. The wheels are dressed with a cup type rotary diamond dresser running at 4200 rpm or 1100 ft./min. (335 m/min.) with a lead of 0.004 inch-/revolution (0.010 cm./revolution) and a depth of dress of 0.0002 inch (0.0005 cm.) on diameter. The wheels and work are measured at the completion of 5, 30, 55 and 80 grinds after dressing. Each grind consists of a rough grind of about 10 seconds at the above feed rate followed by a "sparkout" time wherein the wheel ground out stock using, and reducing the deflection of the system placed there during the rough grind. In grind runs 25 to 28, 50 to 53, and 75 to 78 the grinding pressure is lowered in about 10 p.s.i. increments (0.70 kg./cm.$^2$) to determine the metal removal rate as a function of force applied on the wheel for the calculation of $\Lambda$, the metal removal parameter. An initial value of $\Lambda$ is similarly determined before run 1 with dressing preceding and following this operation. For each sample the four values of grinding ratio, $\Lambda$, profile and finish are averaged.

CONTROLS N, P and Q

Additional grinding wheels were prepared for comparison with grinding wheels containing the abrasive particles of this invention. The grinding wheels employed in the test were prepared as described above and contain the following abrasive particles:

Control N—Abrasive particles prepared from a blend of 160 grams of commercial titanium carbide powder and 40 grams of commercial zirconium diboride powder by the procedure of Examples 1–16. The particles have an apparent density of 5.01 gm./cc. and Knoop$_{1000}$ hardness of 1760 kg./mm.$^2$ Control P—2A aluminum abrasive particles.

Control Q—Cubic boron nitride.

The grinding results are given in Table 3.

TABLE 3

| | | GRINDING RESULTS - RESIN BONDED WHEELS | | | | |
|---|---|---|---|---|---|---|
| Number | Grain Size US Standard Mesh | Grinding Rate* cu.in./min. | Profile (microinches) | Surface Finish (microinches) | $\lambda w.10^5$ cu.in./min.lb.* | Grinding Ratio |
| 1 | 80/100 | .102 | 49 | 5 | 130 | 1267 |
| Control A | 140/170 | .101 | 120 | 4 | 250 | 661 |
| 2 | 80/100 | .105 | 50 | 4 | 110 | 864 |
| 3 | 140/170 | .101 | 44 | 3 | 150 | 980 |
| Control B | 80/100 | .102 | 79 | 5 | 80 | 920 |
| 4 | 80/100 | .104 | 65 | 6 | 90 | 1118 |
| 5 | 80/100 | .103 | 68 | 5 | 135 | 1627 |
| | | .313 | 128 | 9 | 215 | 810 |
| 6 | 100/140 | .103 | 40 | 5 | 90 | 1520 |
| 7 | 140/170 | .096 | 84 | 5 | 149 | 1296 |
| | | .419 | 160 | 9 | 441 | 474 |
| 8 | 100/140 | .099 | 92 | 5 | 118 | 8447 |
| | | .384 | 158 | 5 | 217 | 1988 |
| 9 | 80/100 | .099 | 88 | 5 | 86 | 2142 |
| | | .370 | 91 | 6 | 157 | 1772 |
| 10 | 140/170 | .101 | 57 | 4 | 280 | 750 |
| 11 | 140/170 | .101 | 84 | 4 | 290 | 484 |
| Control C | 80/100 | .102 | 93 | 6 | 83 | 1273 |
| Control D | 140/170 | .103 | 161 | 4 | 120 | 842 |
| Control E | 140/170 | .100 | 85 | 4 | 220 | 754 |
| Control F | 140/170 | .113 | 98 | 9 | 310 | 473 |
| 12 | 80/100 | .101 | 61 | 4 | 100 | 1657 |
| 13 | 140/170 | .101 | 90 | 5 | 100 | 1060 |
| Control G | 140/170 | .100 | 104 | 5 | 90 | 889 |
| 14 | 140/170 | .101 | 70 | 4 | 150 | 1052 |
| 15 | 140/170 | .099 | 40 | 5. | 120 | 862 |

TABLE 3-continued

| | | GRINDING RESULTS - RESIN BONDED WHEELS | | | | |
|---|---|---|---|---|---|---|
| Number | Grain Size US Standard Mesh | Grinding Rate* cu.in./min. | Profile (microinches) | Surface Finish (microinches) | λw.10^5 cu.in./min.lb.* | Grinding Ratio |
| 16 | 140/170 | .101 | 122 | 5 | 230 | 544 |
| Control H | 140/170 | .104 | 81 | 5 | 90 | 889 |
| Control I | 140/170 | .103 | 104 | 4 | 190 | 566 |
| Control J | 140/170 | .101 | 88 | 4 | 220 | 686 |
| Control K | 140/170 | .102 | 65 | 6 | 90 | 767 |
| Control L | 140/170 | .095 | 70 | 4 | 110 | 939 |
| Control M | 140/170 | .100 | 106 | 5 | 100 | 629 |
| Control N | 140/170 | .101 | 56 | 5 | 133 | 1380 |
| Control P | 80/100 | .128 | 103 | 13 | 250 | 529 |
| Control Q | 140/170 | .117 | 82 | 11 | 261 | 1685 |
| | | .460 | 90 | 16 | 1140 | 861 |

*Per inch of wheel width

The data presented in Table 3 above demonstrate the performance characteristics of the compositions of this invention and Controls.

It will be noted that the Surface Finish obtained using the abrasive particles of this invention is superior in all tests to that obtained using commercially available particles. In most instances this is also combined with a superior grinding ratio.

EXAMPLES 17 AND 18

Abrasive particles having the same composition as those prepared in Examples 5-9 are fabricated with a vitreous bond into test wheels with dimensions 1½" × ⅝" × ⅜". The procedure involves using about 50-55 volume percent abrasive grain and 10-15 volume percent glass frit, for example, Pemco J-141. The green bond is formed with dilute sodium silicate solution (1:1, 40° Bé to water).

The mixture is stirred by hand and the wet ingredient mixture pressed under 15 tons total pressure (about 10 tons/sq. in.) applied from both sides by reversing the die. Two wheels are placed side by side on 60 mesh "Alundum" grain in an alumina boat inside a platinum tube furnace. A steady flow of nitrogen dried with $CaSO_4$ is passing over the wheels. The furnace is heated up in about 7 hours and held at 900° C. for about one hour. Then the power is turned off and the wheels cooled in the furnace overnight.

The wheels are tested for strength by spinning at 35,000 rpm. Grinding tests are then run by the procedure used in Examples 1-16. Results are given in Table 4. The testing procedure is the same as for Examples 1-16.

CONTROLS R AND S

Vitreous bonded test grinding wheels are prepared with commercial alumina grain, Norton Type E1X, 60 grit, using the procedure of Examples 17 and 18. The testing procedure is the same as for Examples 1-16.

Grinding results are given in Table 4.

What is claimed is:

1. Abrasive particles consisting essentially of a carbide matrix and boride crystals in a composite system in which, on the basis of the total carbides and boride crystals present,
   A. from 65 to 98 mole percent of the composite is a matrix of at least one solid solution in which
      (i) from 10 to 81 mole percent of the total carbides is titanium carbide,
      (ii) from 18 to 54 mole percent of the total carbides is zirconium carbide, and
      (iii) from 1 to 36 mole percent of the total carbides is tantalum carbide; and
   B. from 2 to 35 mole percent of the composite is crystalline titanium diboride.

2. Abrasive particles of claim 1 in which from 65 to 98 mole percent of the composite is a matrix of at least one solid solution in which
   (i) from 40 to 75 mole percent of the total carbides is titanium carbide,
   (ii) from 20 to 35 mole percent of the total carbides is zirconium carbide, and
   (iii) from 5 to 25 mole percent of the total carbides is tantalum carbide.

3. Abrasive particles according to claim 1 wherein said titanium diboride is present as grains of 0.5 to 30μm.

4. Abrasive particles according to claim 2 wherein said titanium diboride is present as grains of 0.5 to 30μm.

5. Abrasive particles according to claim 1 wherein said carbide matrix is present as grains of up to about 30μm.

6. Abrasive particles according to claim 2 wherein said carbide matrix is present as grains of up to about 30μm.

7. Abrasive particles according to claim 1 wherein the size of said abrasive particles is from −20 to +400 mesh.

8. Abrasive particles according to claim 2 wherein the size of said abrasive particles is from −20 to +400 mesh.

TABLE 4

| | | GRINDING RESULTS - VITREOUS BONDED WHEELS | | | | |
|---|---|---|---|---|---|---|
| Number | Grain Size US Standard Mesh | Grinding Rate* cu.in./min. | Profile (microinches) | Surface Finish (microinches) | λw.10^5 cu.in./min.lb.* | Grinding Ratio |
| 17 | 100/140 | .102 | 49 | 4 | 110 | 1676 |
| 17 | 100/140 | .245 | 50 | 4 | 170 | 1405 |
| 17 | 100/140 | .391 | 74 | 5 | 210 | 992 |
| 18 | 140/170 | .099 | 44 | 7 | 167 | 1608 |
| 18 | 140/170 | .252 | 40 | 8 | 230 | 935 |
| 18 | 140/170 | .386 | 45 | 8 | 260 | 943 |
| Control R | 60 grit | .138 | 114 | 7 | 510 | 209 |
| Control S | 60 grit | .105 | 108 | 10 | 250 | 177 |

*Per inch of wheel width

9. Abrasive particles according to claim 1 wherein the apparent density of said abrasive particles is 5.1 to 8.3 g./cc.

10. Abrasive particles according to claim 2 wherein the apparent density of said abrasive particles is 5.1 to 8.3 g./cc.

11. Process for preparing the abrasive particles of claim 1 by the steps of
   (1) thoroughly mixing tantalum diboride, titanium carbide and zirconium carbide each predominately 1–100μm in maximum dimension, said carbides being present in an amount in excess of the stoichiometric amount required to react with the total amount of tantalum diboride present,
   (2) hot-pressing the mixture of step (1) from 1 to 60 minutes at a temperature from 1900° C. to 2200° C. and at a pressure of at least 2,000 psi to form a hot-pressed compact, and
   (3) crushing said hot-pressed compact of step (2) to form abrasive particles.

12. Process according to claim 11 wherein said mixture of step (1) is milled from 1 to 12 hours and hot-pressed from 5 to 15 minutes at a temperature from 1900° C. to 2050° C. and at a pressure of at least 2,000 psi.

13. Process according to claim 11 wherein said mixture of step (1) is milled from 1 to 6 hours and hot-pressed for 15 minutes at 1900° C. to 2050° C. and at a pressure of 4,000 psi.

14. Process according to claim 11 wherein the mixture employed in step (1) consists essentially of predetermined amounts of titanium carbide, zirconium diboride and tantalum carbide.

15. Process according to claim 11 wherein the mixture employed in step (1) consists essentially of predetermined amounts of titanium carbide, zirconium carbide, tantalum carbide and titanium diboride.

16. In an abrasive device containing a support, bonding agent and abrasive particles, the improvement comprising using particles of the composition of claim 1.

17. A grinding wheel comprising a bond, a filler and the abrasive particles of claim 1.

18. A grinding wheel comprising a bond, a filler and the abrasive particles of claim 2.